United States Patent [19]

Hebert

[11] 4,438,943
[45] Mar. 27, 1984

[54] FIFTH WHEEL SAFETY DEVICE FOR TRACTOR TRAILERS

[76] Inventor: Alfred M. Hebert, Skidmore Rd., Pleasant Valley, N.Y. 12569

[21] Appl. No.: 353,200

[22] Filed: Mar. 1, 1982

[51] Int. Cl.³ .............................................. B62D 53/08
[52] U.S. Cl. ................................. 280/432; 280/446 B
[58] Field of Search ................ 280/432, 446 R, 446 B

[56] References Cited

U.S. PATENT DOCUMENTS

| | | | |
|---|---|---|---|
| 2,201,353 | 5/1940 | Soulis | 280/432 |
| 2,959,429 | 11/1960 | Lavelle | 280/432 |
| 3,353,841 | 11/1967 | Neal | 280/432 |
| 3,580,610 | 5/1971 | Warren et al. | 280/432 |
| 3,733,090 | 5/1973 | Keller | 280/432 |
| 4,067,592 | 1/1978 | Horton | 280/432 |
| 4,120,514 | 10/1978 | Sanders | 280/432 |
| 4,204,700 | 5/1980 | Haines | 280/432 |
| 4,241,934 | 12/1980 | Buehner | 280/432 |

Primary Examiner—Joseph F. Peters, Jr.
Assistant Examiner—D. Lynn Fugate
Attorney, Agent, or Firm—Martin J. Spellman, Jr.

[57] ABSTRACT

A safety device for tractor trailer rigs having a fifth wheel coupling arrangement comprising a trailer bed plate having a pair of oppositely situated slots and a king pin therebetween which extends downwardly into a precisely configured slot in the fifth wheel. The slots in the bed plate are curved along an arc of approximately 160° on opposite sides of the trailer's bed plate about an axis extending through the king pin. The slots are of varying depth which increases towards the middle with resilient shock absorbers mounted at both ends of each slot. A pair of diametrically opposite fluid cylinders are mounted on the fifth wheel to engage the bed plate slots with a plunger element. When the brakes are actuated the pressure of the plunger elements increases against the base of the slots which in an alternate embodiment may be located together with the plunger elements at an angle to the horizontal to achieve a firm coupling. The turning movement of the trailer about the king pin is restricted by the plunger elements to an angle of approximately 80° from an aligned tractor and trailer. The safety device thus limits the movement of the trailer about the king pin to prevent jackknifing.

3 Claims, 9 Drawing Figures

FIFTH WHEEL SAFETY DEVICE FOR TRACTOR TRAILERS

SUMMARY OF THE INVENTION

The present invention pertains to an improved safety device for tractor trailer rigs having a fifth wheel coupling arrangement comprising a trailer bed plate having a pair of oppositely situated slots and a king pin therebetween which extends downwardly into a precisely configured slot in the fifth wheel. The slots in the bed plate are curved along an arc of approximately 160° on opposite sides of the trailer's bed plate about an axis extending through the king pin. The slots are of varying depth which increases towards the middle with resilient shock absorbers mounted at both ends of each slot.

A pair of diametrically opposite fluid cylinders from the truck hydraulic or air system are mounted on the fifth wheel to engage the bed plate slots with a plunger element under pressure. The plungers normally engage the slots but when the brakes are actuated, the pressure of the plunger elements increases against the base of the slots. In an alternate embodiment the plunger elements and the slots may be located at an angle to the horizontal to achieve a firm coupling. The turning movement of the trailer about the king pin is restricted by the plunger elements to an angle of approximately 80° from an aligned tractor and trailer. The safety device thus limits the movement of the trailer about the king pin to prevent jackknifing.

Accordingly, an object of this invention is to provide a new and improved safety device to prevent jackknifing of tractor trailers.

Another object of this invention is to provide an improved anti-jackknifing assembly which is automatically actuable with the vehicle brakes.

Another specific object of this invention is to provide an assembly which automatically cooperates with a novel fifth wheel arrangement to limit the angular movement of a towed trailer from the line of travel and which may be disengaged when desired.

A more specific object of this invention is to provide a new and improved safety device in tractor trailer rigs of the fifth wheel type wherein plunger elements are automatically activated to engage shaped slots in the bed plate of a trailer upon actuation of the vehicle brakes thus limiting the turning movement of the trailer and preventing jackknifing.

BACKGROUND OF THE INVENTION

This invention relates to tractor trailers and particularly to a safety device for a fifth wheel arrangement to eliminate jackknifing. The invention however has broader application and the principles thereof may be incorporated on any towed vehicles.

One of the most serious safety problems encountered in the trucking industry involves the jackknifing of tractor trailer rigs. Jackknifing usually occurs on high speed highways where there is a panic stop particularly when the wheel brakes do not lock at the same time. This action often results in overturning of either or both the tractor and the trailer.

Jackknifing is generally caused by abrupt turns, skids or sway of the tractor trailer such that the momentum of the towed vehicle is in a different direction from the towing vehicle. The resultant jackknifing occurs when one or both of the vehicles are thrown off the line of travel into a sideways skid.

The prior art discloses many arrangements to prevent jackknifing in tractor trailers but there is no disclosure of the unique and advantageous arrangement of the present invention. Among the closer prior art patents, U.S. Pat. No. 4,120,514 to Sanders includes a single forward slotted portion and a single hydraulically actuated pin. The foregoing patent fails to disclose the particular slot arrangement herein with reciprocable pins engaging slots on both sides of a downwardly projecting king pin.

U.S. Pat. No. 4,241,934 to J. F. Buehner discloses a cooperating stop lug and limit stop in an anti-jackknife device with the lug being fluid actuated. U.S. Pat. No. 3,733,090 to A. T. Keller illustrates a further improvement in anti-jackknifing assemblies for trucks involving retractable members which engage stopping blocks on opposite ends of arcuate paths defined on the towed vehicle.

U.S. Pat. No. 4,204,700 to J. R. Haines, Sr. includes a pair of slots in a bed plate with downwardly projecting elements to engage said slots and associated holes in a fifth wheel to eliminate jackknifing. U.S. Pat. No. 3,353,841 is also of interest in this area as are other references but none of the prior art appears to possess the distinct advantages of the present invention which will be discussed hereinafter in the specification.

BRIEF DESCRIPTION OF THE DRAWINGS

Other objects and advantages of the present invention may be seen from the following description when viewed in conjunction with the accompanying drawings wherein.

DETAILED DESCRIPTION OF THE INVENTION

Figure 1:
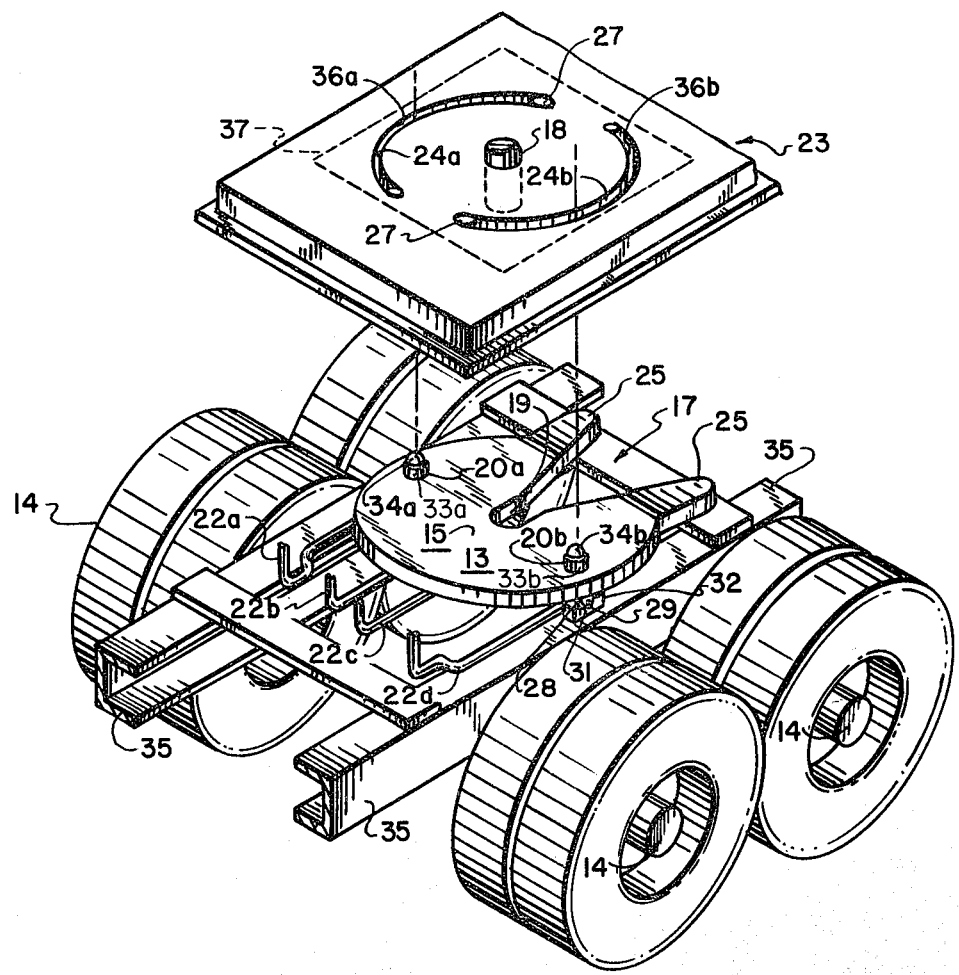
FIG. 1 is a partial perspective view of the safety device for use in a tractor trailer arrangement.

Referring now to the drawings, the invention comprises a safety device for tractor trailers 10 which include a towing vehicle or tractor 11 and a towed vehicle or trailer 12. The rear of the tractor 11 includes a fifth wheel assembly 13 supported over the rear wheels 14 on a flat bed 16. FIG. 1 merely shows the supporting structured members 35 of the tractor 12 in an exploded schematic presentation.

The fifth wheel assembly 13, as shown in FIG. 1, is generally of a conventional construction and hence the details thereof will not be described except as they relate to the present invention. The forward upper surface 15 of the fifth wheel assembly 13 is flat and pivotable into a horizontal plane to support the bed plate 23 of the trailer 12. The rear surface 25 of the assembly 13 tapers downwardly at an angle from the forward portion 15 and includes a shaped notch or slot 17 which is designed to guide the trailer king pin 18 into a base groove 19. The assembly 13 also includes a downwardly extending mounting 28 with a transverse aperture 29 through which a hinge rod 31 is mounted to pivotably secure the assembly 13 to the base mounting 32 at each end.

A pair of plunger elements 20a and 20b project upwardly through apertures 33a and 33b respectively, in the fifth wheel 13. The plunger elements 20a and 20b normally protrude approximately 3 inches from the fifth wheel surface 15 and are connected at their opposite end to cylinders 21a and 21b which are located on the bottom side of the fifth wheel 13. The elements 20a and 20b may include rotatable ball members or bearings 34a and 34b at the ends thereof which normally engage the respective upper surfaces 36a and 36b of the curved slots 24a and 24b.

The cylinders 21a and 21b may be either hydraulically or air actuated through lines 22a-d which are respective inlet and outlet lines for the cylinders. The lines 21a-d are coupled into the brake system for the tractor trailer to be automatically actuated when the brakes are applied. The cylinders 21a and 21b drive the plungers 20a and 20b forward under pressure against the slot surfaces 36a and 36b with which they are normally in riding contact.

Figure 2:
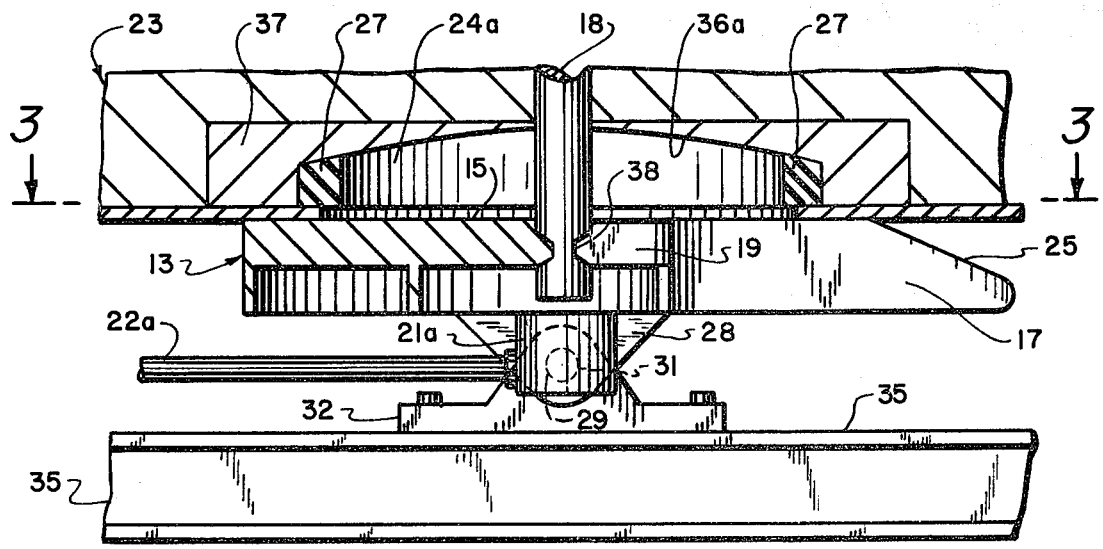
FIG. 2 is a partial cross-sectional view of the safety device with the trailer mounted to the fifth wheel of the tractor trailer.

The bed plate 23 of the trailer 12 is shown in FIG. 1 in an exploded view prior to mounting on the fifth wheel 13 of the tractor 11. FIG. 2 shows the bed plate 23 after mounting on the fifth wheel 13. The bed plate 23 includes a recessed portion 37 which is designed to fit over the fifth wheel 13. The recessed portion 37 is shown as a rectangular in the drawings but any appropriate configuration may be utilized. The bed plate 23 also includes a pair of slots 24a and 24b which are normally engaged by the plunger protrusions 20a and 20b in a riding contact. A king pin 18 having a narrowed intermediate section 38 engages the slot 17 in the fifth wheel 13 and locks into an aperture therein. The king pin 18 couples the trailer 11 in a conventional manner not described herein.

Figure 3:
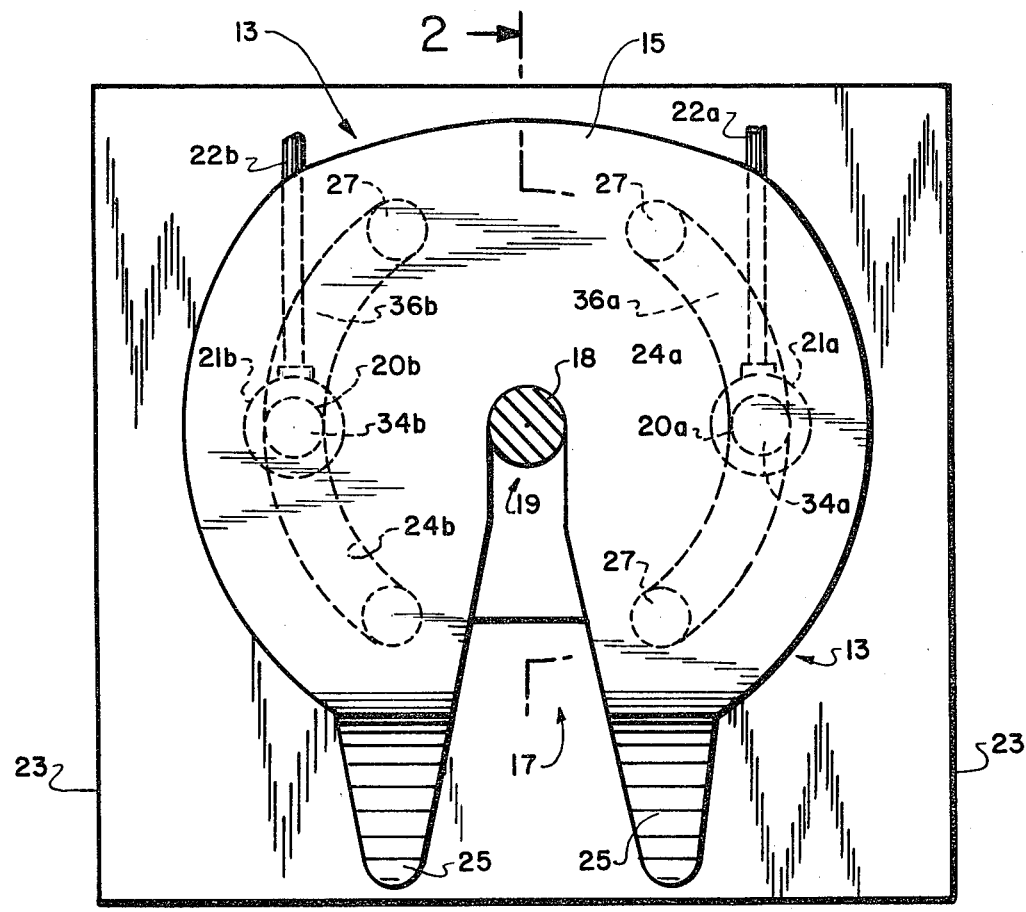
FIG. 3 is a top view of the safety device embodying the invention taken along the lines 3—3 of FIG. 2.

The slots 24a and 24b are located in an arc about the king pin 18, see FIG. 3, such that the pins or plunger elements 20a and 20b are on diametrically opposite sides of a circle including said arcs. The slots 24a and 24b extend over an arc of approximately 160° with a gap of approximately 20° between the respective slots at each end. The plunger elements 20a and 20b are movable within the curved slots as the tractor trailer 10 turns but restrict the movement of the trailer 12 to an angle of approximately 80° from the line of travel to prevent jackknifing. The pressure applied to the plunger elements 20a and 20b adds a further positive control as this force tends to constrain the turning action of the truck 10 particularly in panic stop situations. The plunger elements 20a and 20b engage rubber shock absorbers 27 at each end of the slots 24a and 24b.

As shown in the drawings, the slots 24a and 24b each include curved upper surfaces 36a and 36b which add further resistance to the jackknifing tendency of the truck 10 during a panic stop. The depth of the slots 24a and 24b decrease in an arc from the center position where the tractor 11 and trailer 12 are aligned to both ends which represent a position where a turn is occurring.

Figure 4:
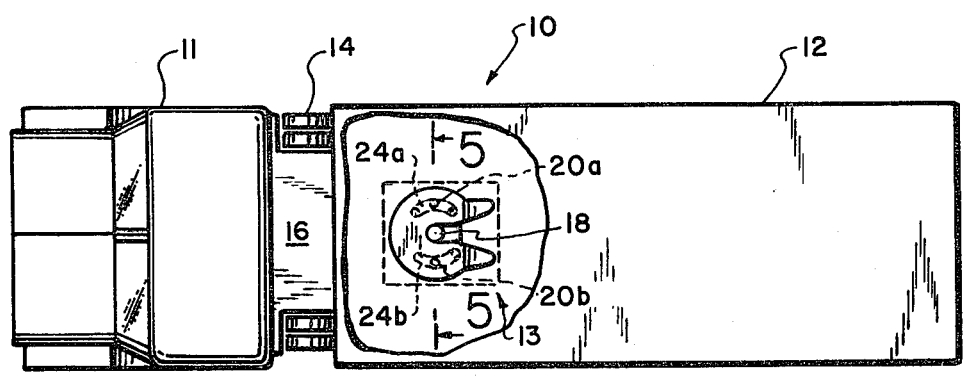
FIG. 4 is a cutaway view of a tractor trailer rig showing the position of the safety device with the tractor and trailer in an aligned position.
Figure 5:
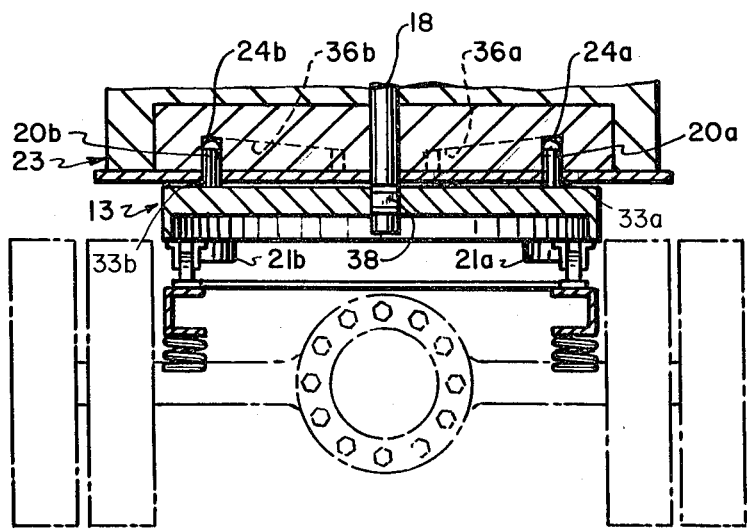
FIG. 5 is a cross-sectional view taken along the lines 5—5 of FIG. 4 showing the position of the plunger elements when the tractor and trailer are aligned.
Figure 6:
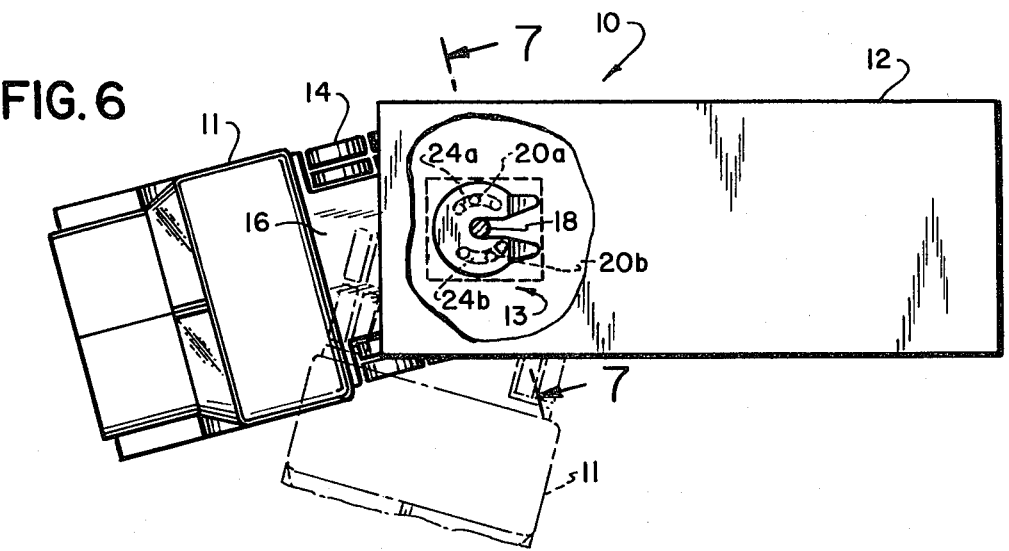
FIG. 6 is a cutaway view of a tractor trailer rig showing the position of the safety device with the tractor and trailer in a turn.
Figure 7:
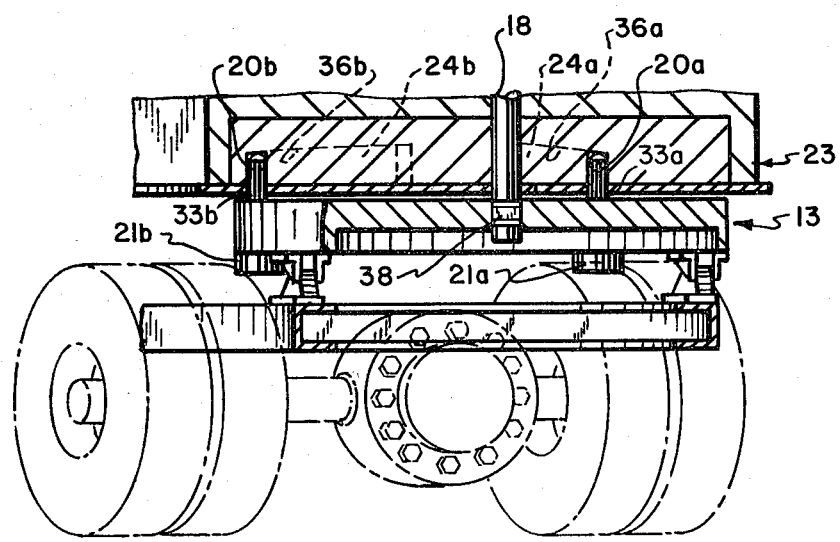
FIG. 7 is a cross-sectional view taken along the lines 7—7 of FIG. 6 showing the position of the plunger elements when the tractor and trailer are in a turn.

FIG. 4 shows the position of the plunger elements 20a and 20b in the slots 24a and 24b when the tractor trailer is moving in a straight line. FIG. 6, on the other hand, shows the position of the plunger elements 20a, 20b within slots 24a, 24b during a turn with the phantom outline of the tractor 11 showing the extreme limit of movement. FIGS. 5 and 7 are respective cross-sectional views of FIGS. 4 and 6 showing the details of the invention and in particular the positioning of the plungers. Means are also provided for disconnecting the plunger elements from the slots 24a and 24b to facilitate turns in spotting and coupling conditions.

Figure 8:
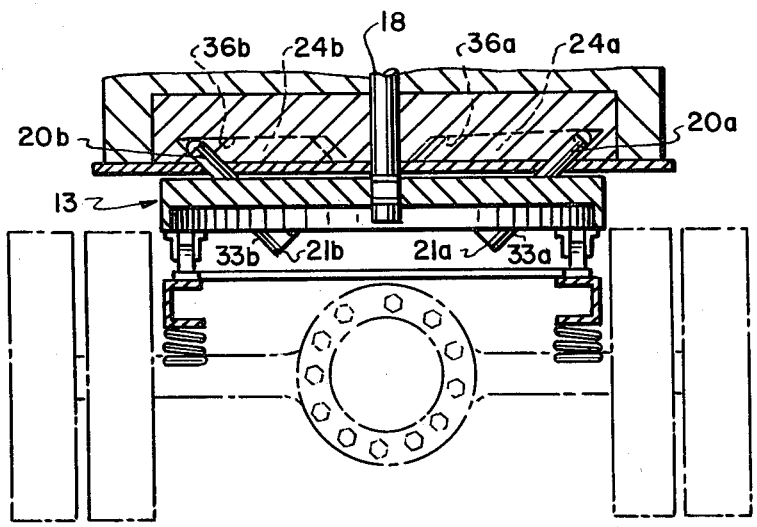
FIG. 8 is a view similar to FIG. 5 showing an alternate embodiment of the invention with the plunger elements and slots set at an angle.
Figure 9:
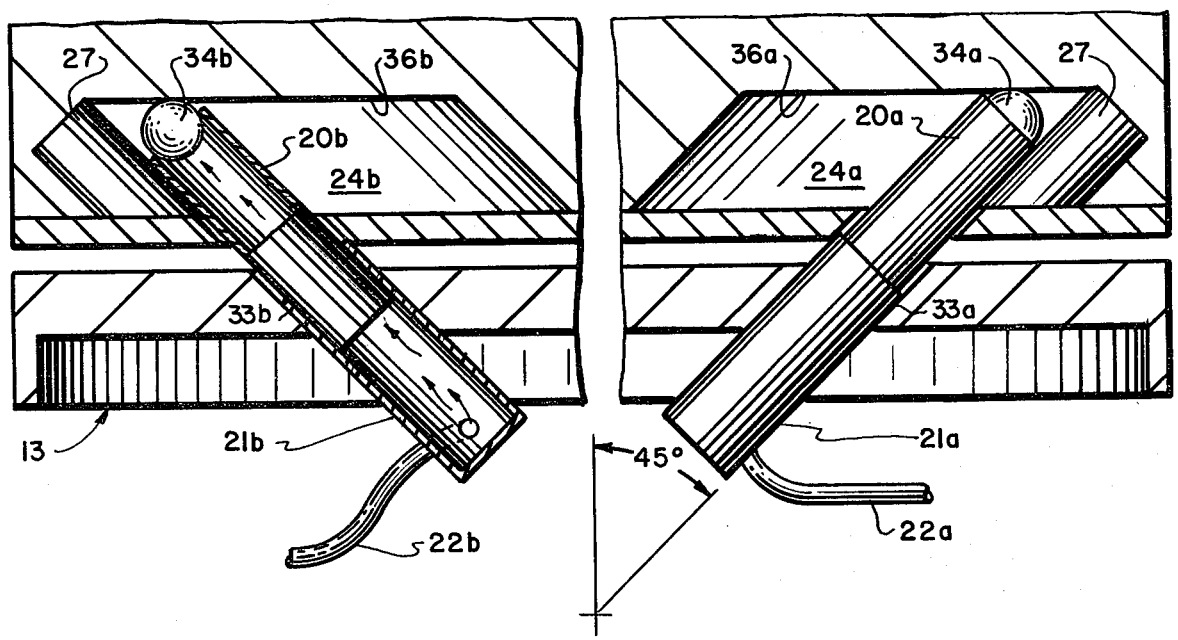
FIG. 9 is an enlarged cross-sectional view showing the plunger elements of FIG. 8 in greater detail.

FIGS. 8 and 9 depict an alternate embodiment of the invention wherein the plungers 20a and 20b are mounted at an angle and extend through the fifth wheel 13 to engage the upper surfaces 36a, 36b of the slots 24a and 24b which are situated at a similar angle. This arrangement tends to provide a very positive locking and anti-jackknifing effect. A curved upper surface 36a, 36b is also usually provided as noted above.

It is understood that the above-described arrangements are merely illustrative examples of the application. Numerous other arrangements may be readily devised by those skilled in the art which will embody the principles of the invention and fall within the spirit and scope thereof.

I claim:

1. A safety device for tractor trailers actuable with the truck brakes comprising:
 a bed plate on the trailer having a downwardly extending king pin and a pair of diametrically opposed slots extending upwardly into the bed plate on both sides of the king pin, said slots in said bed plate each extending over a 160° arc commencing 10° from either side of a longitudinal plane through said king pin to limit the sidewards movement of the trailer to an angle of 80°, rubber shock absorbers at the end portions of each slot, each slot having a curved base of increasing depth towards the center thereof in an arc of approximately 160° on each side of the king pin in a circle formed by the kin pin as the center thereof,
 a fifth wheel mounted on the tractor having a notched portion to engage the king pin and a pair of oppositely situated pistons each piston having a plunger element which extends upwardly into one of said slots in said bed plate, and,
 means for actuating the plunger elements simultaneously with the brakes to forcefully engage the slots to prevent jackknifing of the trailer.

2. A safety device in accordance with claim 1 wherein:
 said plunger elements normally engage an upper surface of the slots under pressure, and each of said plunger elements includes a roller bearing at the end thereof to contact said surface.

3. A safety device for tractor trailers actuable with the truck brakes comprising:
 a bed plate on the trailer having a downwardly extending king pin and a pair of diametrically opposed slots extending upwardly into the bed plate on both sides of the king pin, a fifth wheel mounted on the tractor having a notched portion to engage the king pin and a pair of oppositely situated pistons each piston having a plunger element which extends upwardly into one of said slots in the said bed plate, and, means for actuating the plunger elements simultaneously with the brakes to forcefully engage on upper surfaces of the slots under pressure to prevent jackknifing of the trailer, each of said plunger elements including a roller bearing at the end thereof to contact said upper surface.

* * * * *